July 18, 1950 G. W. REEVES 2,515,357
DRAWING INSTRUMENT
Filed Dec. 20, 1946 3 Sheets-Sheet 1
FIG 1
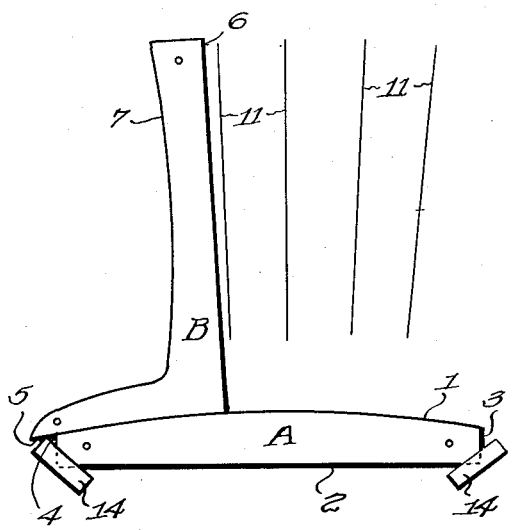
FIG 2
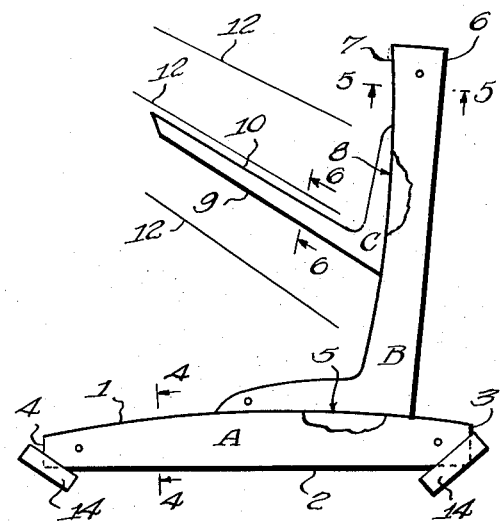
FIG. 3.
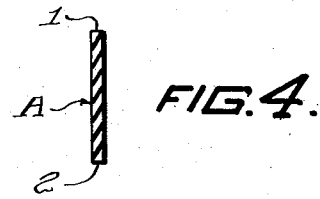
FIG. 4.
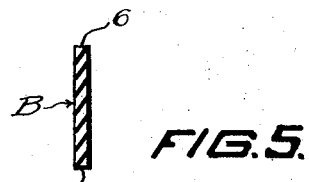
FIG. 5.
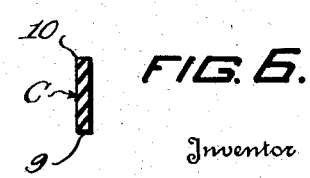
FIG. 6.
Inventor
George W. Reeves
By Baldwin & Wight
Attorneys July 18, 1950     G. W. REEVES     2,515,357

DRAWING INSTRUMENT

Filed Dec. 20, 1946     3 Sheets—Sheet 2

Inventor
George W. Reeves
By Baldwin & Wight
Attorneys

July 18, 1950  G. W. REEVES  2,515,357
DRAWING INSTRUMENT

Filed Dec. 20, 1946  3 Sheets-Sheet 3

Inventor
George W. Reeves
By Baldwin & Wight
Attorneys

Patented July 18, 1950

2,515,357

UNITED STATES PATENT OFFICE 2,515,357

DRAWING INSTRUMENT

George Warren Reeves, Wichita, Kans.

Application December 20, 1946, Serial No. 717,571

4 Claims. (Cl. 33—77)

This invention relates to drawing instruments, and more particularly to instruments for use in drawing perspective views or views in the nature of perspective views.

An object of the invention is to provide a novel and simple instrument or tool comprising parts which may be arranged and engaged with each other in such relative positions as to facilitate the drawing of perspective or perspective-like views having lines extending in a plurality of directions to converge upon three vanishing points.

Another object of the invention is to provide an instrument of the character referred to in which the parts are so constructed and relatively formed as to render them adaptable for drawing both inside and outside views, and views of an article as it appears either from above, at a visual angle of elevation, or from below at a visual angle of depression.

Other objects will become apparent from a reading of the following description, the appended claims, and the accompanying drawings, in which:

Figure 1 is a top plan view showing two parts of the instrument in cooperative position;

Figure 2 is a top plan view showing all three parts of the instrument cooperatively arranged in positions which may be termed for convenience "index right";

Figure 3 is a view similar to Figure 2 but showing the parts in positions conveniently termed "index-left";

Figure 4 is a section on the line 4—4 of Figure 2 drawn on an enlarged scale;

Figure 5 is a section on the line 5—5 of Figure 2 drawn on an enlarged scale;

Figure 6 is a section on the line 6—6 of Figure 2 drawn on an enlarged scale;

Figure 7:
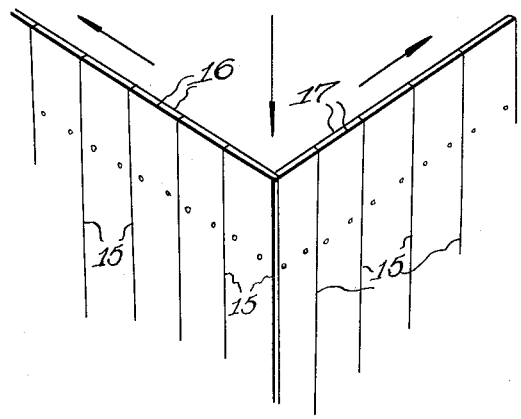
Figure 7 shows an example of work which may be done with the aid of the instrument, being a perspective view looking downwardly on the outside corner of a fence.

The instrument shown as embodying the invention in a representative form includes three parts A, B, and C, all of which are flat and formed of any suitable rigid or semi-rigid material, which preferably should be transparent, and may be of any of a number of suitable plastics or compositions. The part A normally is used as a base part and is adapted to be set stationarily or secured on a drawing board or surface. The part B is an intermediate part which is adapted to be positioned in any of a number of selected positions with respect to the part A and to be located definitely by engagement with the part A. The third part C is adapted to be set in selected positions and located by engagement with the intermediate part B.

Considered in more detail, the base part A is in the form of a bar having a convexly arcuate edge 1, an edge 2 which may be substantially parallel with the chord of the convex edge 1, and ends 3 and 4. The intermediate part B is generally L-shaped and has a concave arcuate edge 5 on the same radius as the radius of the convex edge 1 of the part A. The part B also includes a straight edge 6 which is radial with respect to the concave edge 5. A concavely arcuate edge 7 on the part B has its chord substantially parallel to the straight edge 6 and substantially radial with respect to the concave edge 5. The part C is of modified L-shape, and has a convexly arcuate edge 8 on a radius equal to the radius of the concave edge 7 of the part B. The part C also has two straight edges 9 and 10 each of which extends at a substantial angle, but not a right angle to the chord of the arc 8. This angle is between 45° and 90° and preferably is substantially less than 90°.

The instrument comprising the parts A, B, and C can be used for drawing all necessary straight lines in perspective views or views in the nature of perspective views regardless of the visual angle of observation of the article being drawn. Generally stated, the base part A is fixed or secured in position with respect to the drawing surface, for example, in the position shown in Figure 1, and the part B is placed on the drawing surface with its concave edge 5 engaging or mating with the convex edge 1 of the base part A. The part B can then be moved across the part A to different positions, and substantially vertical lines 11 can be drawn as indicated in Figure 1 in which the lines 11 are shown as extending toward a vanishing point beyond the bottom of Figure 1. In order to draw lines 12 (Figure 2) converging beyond the left of the drawing, the intermediate part B may be positioned as shown in Figure 2 and held stationary while the third part C, with its convex edge 8 engaging the concave edge 7 of the part B, is moved to different positions with respect to the concave edge 7. Lines 12 are drawn by ruling along either the edge 9 or edge 10 of the part C. Since the straight edges 9 and 10 on the part C are not radial to the edge 8, lines drawn along either of these surfaces, with the part C in different positions on the part B, will not intersect at a single vanishing point, but will intersect on an arc extending about the point forming the center of the edge 8. Inasmuch as the part C is moved through so few degrees when moved in contact with the edge 7 of the part B, lines drawn along the edges 9 or 10 will intersect so nearly at a point that the deviation from mathematically perfect vanishing point intersection will be undiscernible to the eye. For convenience, the arrangement of the parts shown in Figure 2 will be referred to as "index right."

In order to draw lines 13 converging beyond the right of the drawing, the parts B and C are reversed right to left so as to occupy the positions shown in Figure 3, which will be referred to as "index left."

When drawing lines toward vanishing points beyond the right or left of the drawing, the angle of visual elevation can be changed as desired by setting and maintaining the intermediate part B at different positions with respect to the base part A. Thus, considering Figure 2, the part B is so positioned relatively to the part A that the lines 12 indicate a relatively high angle of visual elevation, whereas if the part B were positioned closer to the center of the part A, a relatively lower angle of visual elevation would be indicated by the lines drawn along the straight edge 9 or the straight edge 10 of the part C. The part C may be made with a selected angle between the edge 9 (or 10) and the chord of the arcuate edge 8, according to the range of visual angles of elevation or depression desired to be depicted in the views to be drawn.

It will be understood that in drawing lines such as the lines 12 in Figure 2 or the lines 13 in Figure 3, the part B is set in a selected position with respect to the part A and is held there until all of a group of lines 12 or 13 are drawn. Generally, the part B will be retained in position by a draftsman's hand. For convenience, the part A may be secured to the drawing surface by any suitable device, for example by short pieces of adhesive tape 14 extending across the lower corners of the part A and adhered to the drawing surface.

Figure 9:
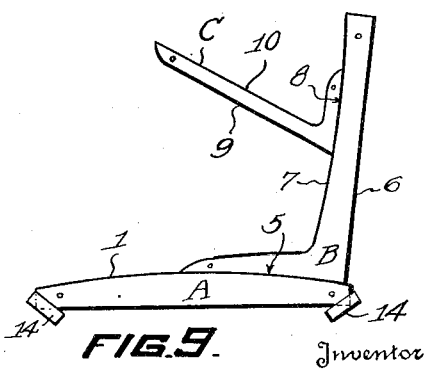
Figure 9 is a top plan view of the instrument showing the parts in the relative positions occupied for drawing certain lines in the examples shown in Figures 7 and 8.

The practical working and utility of the invention may best be explained by reference to several examples of drawings which may be made with its aid. Figure 7 is an outside view looking downwardly upon the corner of a fence. In order to construct such a view, the parts A, B, and C are set in the "index right" position as shown in Figures 9 and 2. The substantially vertical lines 15, which extend toward a vanishing point beyond the bottom of the drawing, are drawn along the straight edge 6 of the part B with the latter placed in different positions along the edge 1 of the part A. The lines 16 at the top and to the left of the corner of the fence are drawn on the edge 10 of the part C while the latter is set in two positions with respect to the part B, the part B being held stationary during drawing of the lines 16. To draw the lines 17 at the top and to the right of the fence corner, the instrument parts A, B, and C are changed to the "index left" arrangement as shown in Figure 3. The lines 17 are then drawn along the straight edge 10 of the part C. The three arrows in Figure 7 show the direction of convergence of the lines toward three vanishing points.

Figure 8:
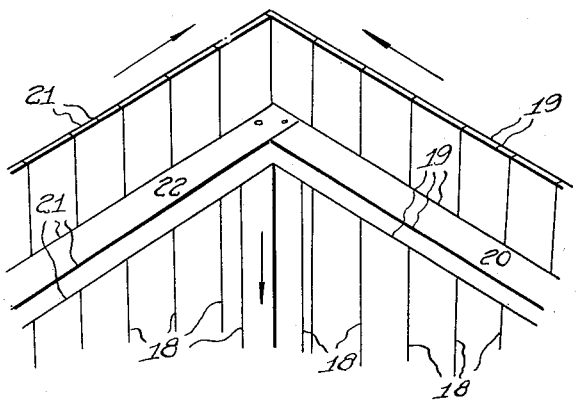
Figure 8 shows another example, being a perspective view looking downwardly of the inside corner of a fence.

Figure 8 is an inside view looking downwardly upon a fence corner. In order to draw the vertical lines 18, the instrument parts are arranged in the "index right" positions as shown in Figure 9, and the lines 18 are drawn along the straight edge 6 of the part B. To draw the lines 19 showing the top of the fence and the stringer 20 at the right of the fence corner, the part C is moved to different positions on the part B while the latter is held stationary, and the lines are drawn along the straight edge 10 of the part C. In order to draw the slanting lines 21 denoting the top of the fence and the stringer 22 at the left of the corner, the parts B and C are reversed right to left, that is to the "index left" position shown in Figure 3. The three arrows in Figure 8 indicate the convergence of the lines toward the three vanishing points.

Figure 10:
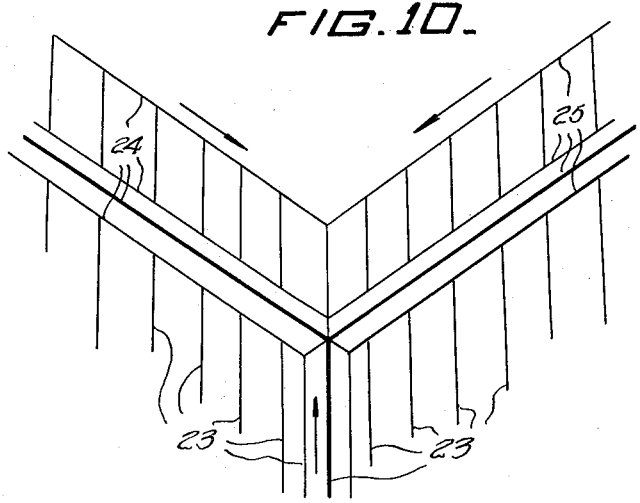
Figure 10 shows an example of work which may be done with the aid of the instrument, being a perspective view looking upwardly at the inside corner of a fence.
Figure 12:
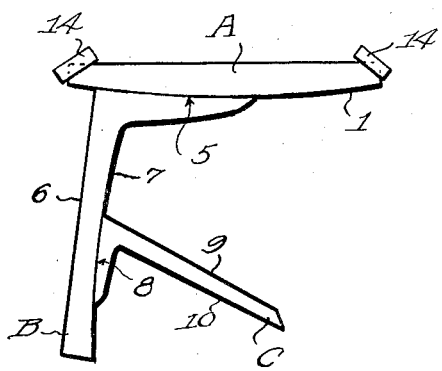
Figure 12 is a top plan view of the instrument showing the parts in the relative positions occupied for drawing certain lines in the examples shown in Figures 10 and 11.

Figure 10 is an inside perspective view looking upwardly at the corner of a fence. In using the instrument A, B, and C to draw such a view, the parts are set as shown in Figure 12 in which they are inverted from the "index left" (Figure 3) position. The vertical lines 23 are drawn along the straight edge 6 of the part B as the latter is moved to different positions in engagement with the convex edge 1 of the part A. It will be seen that these lines converge upon a vanishing point beyond the top of the drawing instead of beyond the bottom of the drawing as in Figure 7. In order to draw the diagonals 24 at the left to the frence corner, the part B is held stationary and the part C is moved to different positions, the lines 24 being drawn along the straight edge 9 of the part C when the latter is in its selected positions. In order to draw the diagonals 25 at the right of the fence corner, the parts B and C are reversed left to right, or considered differently, are inverted from the "index right" position, shown in Figure 2. The part C is then set in different positions on the part B, and the lines 25 are drawn along the straight edge 9. The three arrows indicate the convergence of the several lines toward the three vanishing points.

Figure 11:
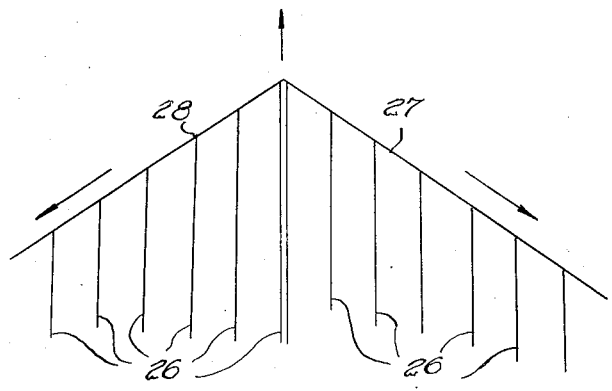
Figure 11 shows another example, being a perspective view looking upwardly at the outside corner of a fence.

Figure 11 is an outside perspective view looking upwardly at the corner of a fence. In order to draw such a view, the instrument parts are inverted from the "index left" (Figure 3) position and the vertical lines 26 are drawn along the straight edge 6 of the part B with the latter set in different positions with respect to the part A. In order to draw the diagonal line 27 at the right of the fence corner, the part B is held stationary, the part C is moved to a selected position, and the line 27 is drawn along the straight edge 9. To draw the diagonal line 28 at the left of the fence corner, the parts A, B, and C are reversed or moved to a position inverted with respect to the "index right" position, and the line 28 is drawn along the straight edge 9 of the part C.

The adaptability of the instrument for use as an aid in drawing objects as viewed from different positions is believed to be well exemplified by Figures 7, 8, 10, and 11 which illustrate the marked and very advantageous flexibility of use or versatility of the instrument. The angle of visual elevation or depression may be changed at will, within practical limits, and either outside or inside views may be drawn.

Figure 13:
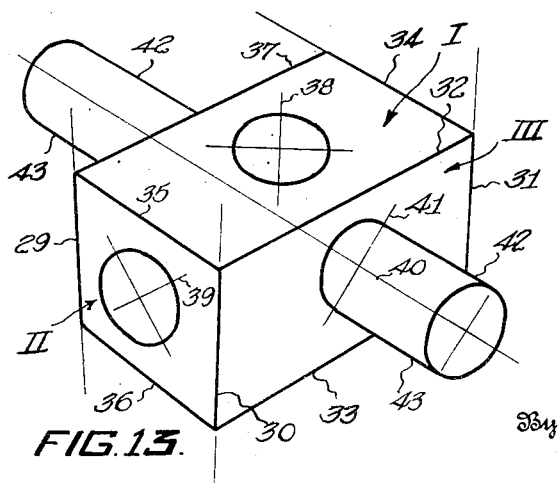
Figure 13 shows a further example of a perspective or perspective-like view which may be drawn with the aid of the instrument.

The utility or versatility of the instrument may further be explained by reference to the drawing of a block formed with holes, and a shaft or rod extending through the block as shown in Figure 13. In making such a view the base part A is first secured to the drawing surface as by the tapes 14, and the three vertical lines 29, 30, and 31 are drawn along the straight edge 6 of the part B. With all three parts A, B, and C in the "index left" position, the lines 32 and 33 are drawn along the straight edge 10 of the part C. The parts are then set in the "index right" position and the lines 34, 35, and 36 are drawn along the straight edge 10. The parts A, B, and C are then arranged in the "index left" position again, and the line 37 is drawn along the straight edge 10. This will complete the drawing of the block itself.

In order to draw a hole in the top surface I of the block, a spot or point is located on the surface I and a line 38 is drawn along the straight edge 6 of the part B and through the point or spot. The line 38 will serve as the minor axis of an ellipse which can be drawn with the aid of a template.

In order to draw a hole in the vertical left surface II of the block, a dot or point is marked on the surface II and the instrument parts are set in the "index left" position. A line 39 is then drawn along the straight edge 10 of the part B and through the dot or point. The line 39 is the minor axis of an ellipse which may be drawn with the aid of a template.

In the drawing of a shaft passing through the block, a dot or point is first marked where it is desired that the axis of the shaft intersect the right surface III of the block. The instrument parts are then set in the "index right" positions and a line 40 is drawn along the straight edge 10 of the part C and through the dot. The line 40 will represent the center line of the shaft and the minor axis of an ellipse. After the drawing of the line 40, another line 41 is drawn perpendicularly to the line 40. The line 41 will be positioned as the major axis of the ellipse. With the parts A, B, and C in the "index right" position, lines 42 and 43 are drawn along the straight edge 10 of the part C, and an ellipse is drawn at each end of the shaft and at the intersection of the shaft with the block surface III.

It is apparent that an instrument embodying the invention may be used for drawing all kinds of perspective or perspective-like views. The instrument shown and described by way of illustration embodies the invention in its preferred form, but changes may be made without departing from the invention as defined in the claims.

I claim:

1. A three part instrument for use in drawing views in the nature of perspective views, comprising a base part adapted to be set stationarily on the drawing surface and having an edge which is convex in a plane generally parallel to the plane of said surface; a movable intermediate part having a concave edge adapted to engage said base part convex edge at different parts of said convex edge and also having a concave edge the chord of which is at a substantial angle to the chord of said base part convex edge; and a movable third part having a convex edge adapted to engage said intermediate part concave edge at different parts thereof when said intermediate part is in different cooperative positions with respect to said base part, said third part also having a relatively straight edge at a substantial angle to the chord of said intermediate part concave edge.

2. A three part instrument for use in drawing views in the nature of perspective views, comprising a base part adapted to be set stationarily on the drawing surface and having an edge which is convex in a plane generally parallel to the plane of said surface; a movable intermediate part having a concave edge adapted to engage said base part convex edge at different parts of said convex edge and also having a straight edge at a substantial angle to the chord of said base part convex edge, and a concave edge the chord of which is at a substantial angle to the chord of said base part convex edge; and a movable third part having a convex edge adapted to engage said intermediate part concave edge at different parts thereof when said intermediate part is in different cooperative positions with respect to said base part, said third part also having a relatively straight edge at a substantial angle to the chord of said intermediate part concave edge.

3. An instrument as defined in claim 1 in which the chord of the intermediate part concave edge is substantially radial with respect to the base part convex edge.

4. An instrument as defined in claim 1 in which the chord of the intermediate part concave edge is substantially radial with respect to the base part convex edge, and in which the angle between the third part relatively straight edge and the chord of the intermediate part convex edge is between 45° and 90° and is substantially less than 90°.

GEORGE WARREN REEVES.

REFERENCES CITED

The following references are of record in the file of this patent:

UNITED STATES PATENTS

| Number | Name | Date |
| --- | --- | --- |
| 15,359 | Von Kammerhuber | July 15, 1856 |

FOREIGN PATENTS

| Number | Country | Date |
| --- | --- | --- |
| 208,211 | Great Britain | Dec. 11, 1923 |
| 275,755 | Germany | June 27, 1914 |